United States Patent [19]
McMinn

[11] Patent Number: 5,327,452
[45] Date of Patent: Jul. 5, 1994

[54] FOREHEARTH

[75] Inventor: John McMinn, Rotherham, England

[73] Assignee: Parkinson-Spencer Refractories Limited, West Yorkshire, England

[21] Appl. No.: 850,517

[22] Filed: Mar. 13, 1992

[30] Foreign Application Priority Data

Mar. 13, 1991 [GB] United Kingdom ............... 9105263

[51] Int. Cl.$^5$ .......................... C03B 5/02; C03B 5/04
[52] U.S. Cl. ............................. 373/27; 373/29; 373/30; 373/31; 373/40; 65/346; 65/337; 65/135
[58] Field of Search ............... 373/5, 27, 30, 33, 34, 373/35, 36, 39, 40, 41, 134; 65/346, 347, 337, 356, 135, 136

[56] References Cited

U.S. PATENT DOCUMENTS

| | | | |
|---|---|---|---|
| 1,879,718 | 9/1932 | Soubier | 65/326 |
| 2,144,973 | 1/1939 | Honiss | 65/137 |
| 3,582,310 | 6/1971 | Avery et al. | 65/346 |
| 3,999,972 | 12/1976 | Brax | 65/337 |
| 4,207,065 | 6/1980 | Ackermann et al. | 373/30 |
| 4,294,603 | 10/1981 | Winzer et al. | 65/346 |
| 4,494,974 | 1/1985 | Vilk et al. | 65/337 |
| 4,511,385 | 4/1985 | Barkhau et al. | 65/135 |
| 4,552,579 | 11/1985 | Blumenfeld et al. | 65/346 |
| 4,622,059 | 11/1986 | Brown | 65/160 |
| 4,655,812 | 4/1987 | Blumenfeld | 65/346 |
| 4,680,051 | 7/1987 | Blumenfeld et al. | 65/346 |
| 4,750,928 | 6/1988 | Bolin et al. | 65/346 |

FOREIGN PATENT DOCUMENTS

| | | |
|---|---|---|
| 145427 | 6/1985 | European Pat. Off. . |
| 3119816 | 1/1983 | Fed. Rep. of Germany . |
| 2220480 | 11/1974 | France . |
| 2564086 | 11/1985 | France . |
| WO83/01440 | 4/1983 | PCT Int'l Appl. . |

Primary Examiner—Bruce A. Reynolds
Assistant Examiner—Tu Hoang
Attorney, Agent, or Firm—Sheridan Ross & McIntosh

[57] ABSTRACT

A forehearth for a glass furnace comprises a trough and roof over the trough, the roof having two longitudinal ridges extending downwardly towards the surface of the glass to define three longitudinal chambers. The central chamber forms a conduit for the flow of cooling air over the central part of the stream of glass and the side chambers serve as conduits for the flow of combustion gas. Separate outlets are provided for the cooling and combustion gases and controllable dampers are provided at least on the combustion gas outlets. Balancing of the internal pressures between the three chambers can ensure that there is little or no significant mixing of the cooling air and combustion gases and accurate control of the cooling and/or heating can be obtained by control of the dampers.

14 Claims, 6 Drawing Sheets

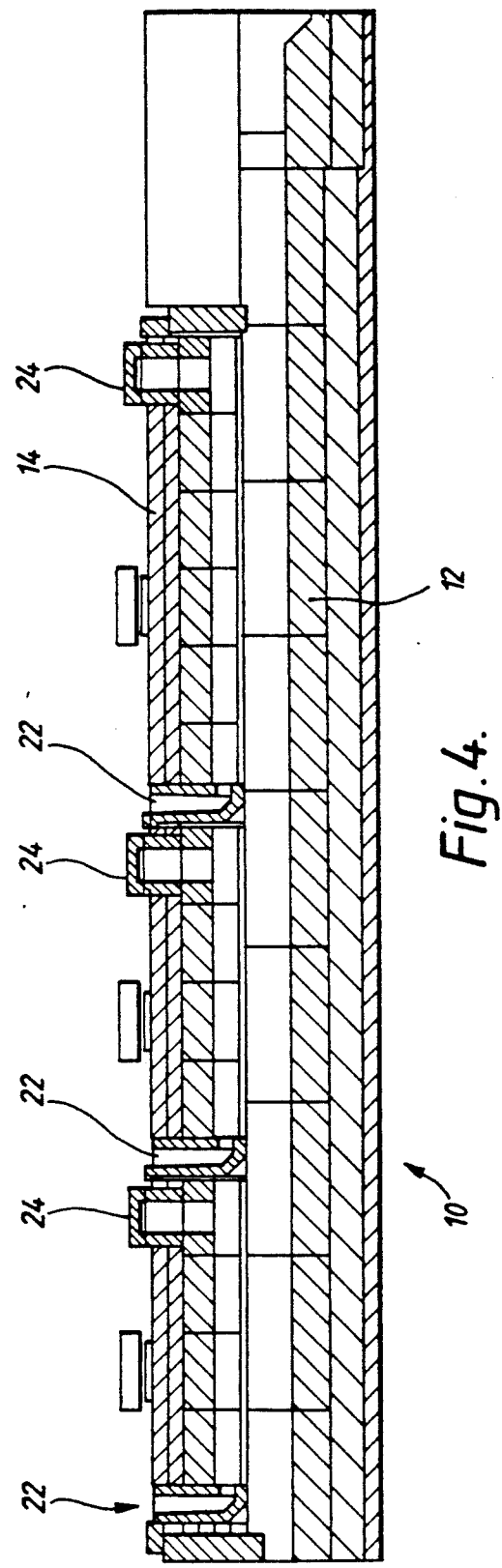

FOREHEARTH

BACKGROUND OF THE INVENTION

1. Field of the Invention

This invention relates to a forehearth and more particularly relates to a feeder forehearth for supplying glass from a furnace to glass forming machinery.

2. Description of Related Art

A forehearth is a channel linking a glass forming machine to the glass melting furnace. In addition to providing a physical link, its most important function is to thermally condition the glass to match the requirements of the forming machine. The normal requirement is that the forehearth should take hotter glass from the furnace and deliver cooler glass to the forming machine in such a manner that no temperature gradients exist within the glass as supplied to the forming machine. In reality this level of glass temperature homogeneity is virtually impossible to achieve. However new processes and faster production speeds make the importance of temperature homogeneity considerably more important.

To obtain the necessary lower temperatures required by the forming machines some form of cooling must be provided. To ensure temperature homogeneity, a heat input is also required to control the loss of temperature particularly in respect of areas more subject to conductive heat loss, e.g. from the side walls of the forehearth.

One current forehearth proposal employs longitudinal hot face forced convection cooling. In this method of cooling, cooling air is introduced to the forehearth via a roof block arrangement and exits from an exhaust located in the centre of the forehearth at a position further down stream from the inlet. The amount of heat removed from the forehearth is then a function of the air flow rate, the residence time of the cooling air in the forehearth, and various physical parameters such as the heat transfer co-efficient and the emissivity of the roof block. In this proposal the shape of the roof block is such as to partially divide the forehearth into three chambers longitudinally. The outer two chambers concentrate combustion gases from side wall mounted burners to the sides of the forehearth (which suffer more heat loss) and the central chamber is used to channel cooling air from the air inlet to the central exhaust. In this construction no other exhaust flue exists in the cooling section of the forehearth. Control of the forehearth is such that if the temperature of the glass (as measured by a suitable temperature sensor) is seen to be over a given set point then a controller sends a signal which restricts the amount of combustion gases entering the burners and at the same time increases the amount of cooling air entering the forehearth central chamber. A damper fitted above the central cooling air exhaust lifts to allow the extra cooling air to be removed. Since no separate flues are provided for the combustion gases, these also exhaust through the cooling gas outlet.

The present invention seeks to provide a forehearth having improved temperature control and homogeneity and in which the combustion gases and cooling gases are as far as possible kept separate.

SUMMARY OF THE INVENTION

According to the present invention there is provided a method of homogenizing molten glass in a forehearth for a glass furnace which comprises causing the glass to flow in a longitudinal stream, heating the side portions of the stream of glass by means of combustion gases and cooling the central portion of the stream of glass by a longitudinal air flow characterized in that separate outlets are provided for the combustion gases and the cooling gases, and the flow of combustion gases is controlled by controlling the degree of opening of the combustion gas outlets.

The invention also provides a forehearth for a glass furnace which comprises a trough and a roof over the trough, the roof having two longitudinal ridges extending downwardly towards the surface of the glass to define three longitudinal chambers, the central chamber forming a conduit for flow of cooling air over the central part of the stream of glass and the side chambers serving as conduits for the flow of combustion gas characterized in that separate outlets are provided for the cooling and combustion gases and controllable dampers are provided at least on the combustion gas outlets.

By separating the combustion and cooling zones, by having separate outlets (as well as inlets) for the combustion and cooling gases, the inherent mixing of cooling air and combustion gases which occurs in the previous proposal referred to above is avoided. Furthermore, in the apparatus according to the invention, it is preferred that the longitudinal ridges extending downwardly reach as close as possible to the glass surface thereby separating more sharply the three longitudinal "chambers" and providing a greater degree of isolation between the three areas. By balancing or adjusting the internal pressures in each of the three chambers it can be ensured that no significant mixing of the cooling air and combustion gases occurs.

This concept of adjusting or balancing the pressures of adjacent heating and cooling chambers is unique to the present invention and allows fine and accurate control of temperature to be obtained.

Alternatively, where it is desired to heat the glass even in the central area (as may from time to time occur if excessive cooling has taken place) then by selectively closing the combustion gas outlets combustion gases are forced into the central area so as to exhaust through the cooling gas outlet and thereby heat the glass flow across its entire surface.

In order to achieve the precise control of combustion gas exit through the combustion gas outlets, it is preferred to provide damper blocks based upon a parallelogram of principle rather than the simple up/down damper movements previously provided.

The invention will be described further, by way of example, with reference to the accompanying drawings.

BRIEF DESCRIPTION OF THE DRAWINGS

FIG. 4 is a longitudinal section;

DESCRIPTION OF PREFERRED EMBODIMENTS

Figure 1:
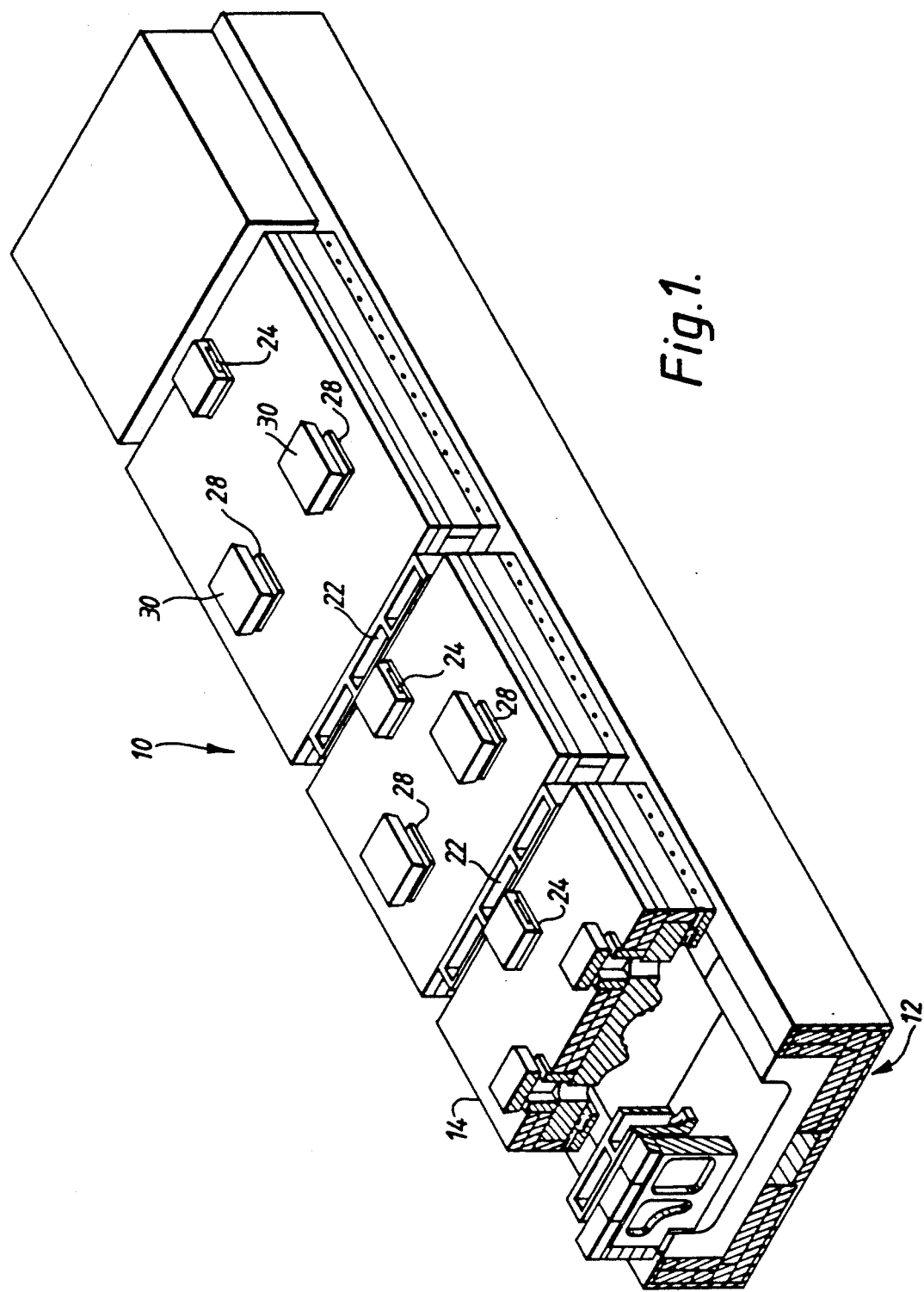
FIG. 1 is a perspective view, partially cut away, of a forehearth in accordance with an embodiment of the present invention.
Figure 2:
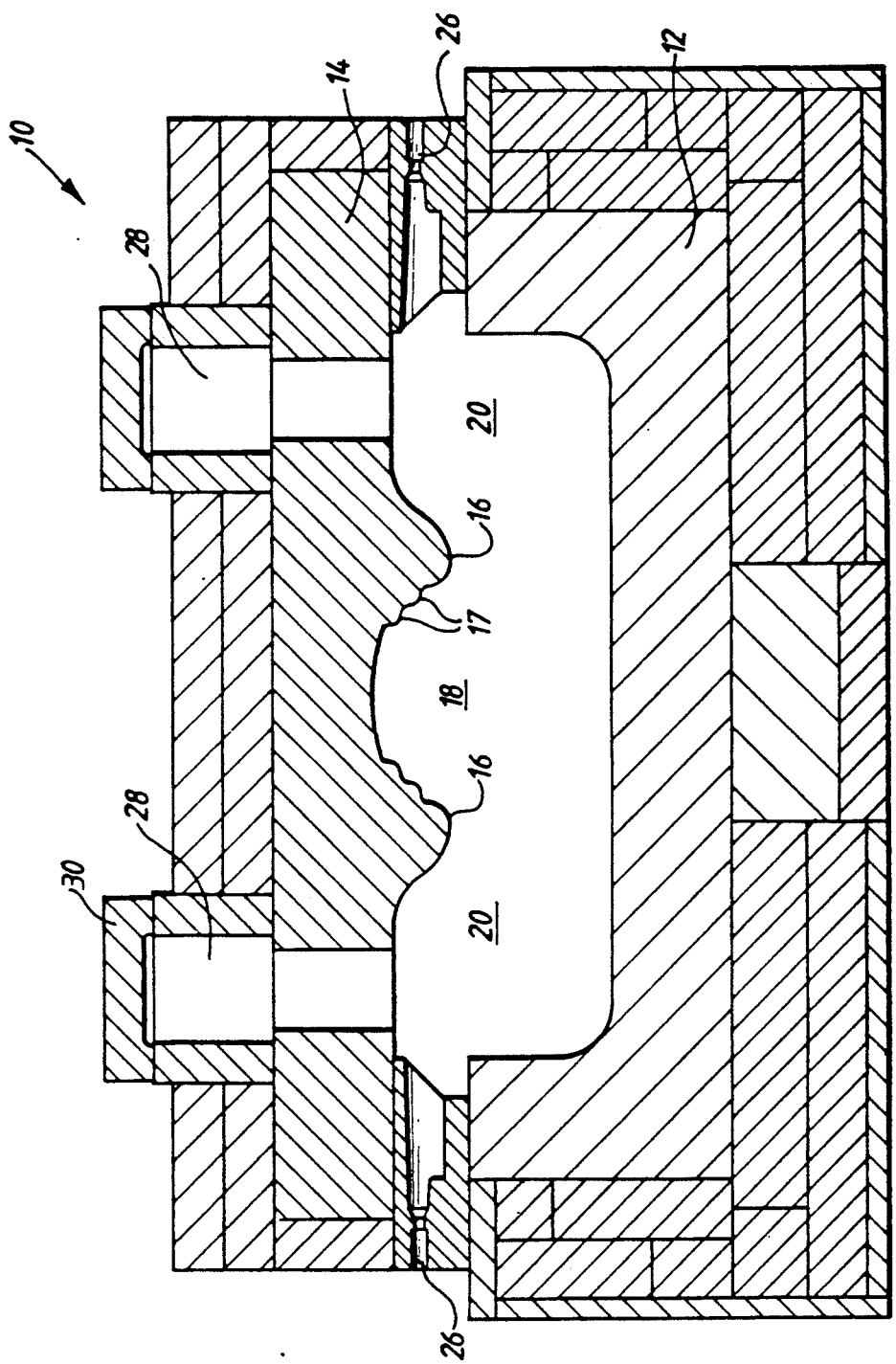
FIG. 2 is a cross-sectional view on an enlarged scale corresponding to FIG. 1.

Referring to the drawings, the feeder forehearth generally designated 10 comprises a trough portion 12 and a roof 14 over the trough. The roof has two longitudinal ridges 16 which, in use, extend downwardly towards the surface of the glass flow and are dimensioned so as to be as close as practicable to the glass surface. The ridges 16 therefore divide longitudinally the trough 12 into three chambers or zones, namely a central cooling chamber 18 and two outer side chambers 20. Longitudinal corrugations 17 are also provided to increase the surface area available to receive heat radiated from the surface of the glass. As can be seen from FIG. 4 the forehearth 10 is divided into a number of sections along its length and each section is provided with a cooling air inlet 22 and a corresponding outlet 24. As can be appreciated from FIG. 1, both the inlets and outlets on each section communicate with the central chamber 18.

In addition, gas burners 26 are positioned along the sides of the unit so as to heat by means of the combustion gases the side chambers 20. Corresponding exit flues 28 for the combustion gases are provided in the roof 14 over the side chambers 20. Each flue 28 has an associated damper 30, the operation of which can be seen in more detail from FIG. 3 and will be described hereinafter.

In general operation of the device glass passes down the trough 12 from left to right as viewed in FIG. 4. The burners 26 operate to produce hot combustion gases in the side chambers 20, keeping the sides of the streams from cooling too rapidly, while at the same time cooling air is passed through the inlets 22 longitudinally along the face of the central chain of the glass within the central chamber 18 and out through the cooling gas exhaust outlets 24. A number of sections are provided since if the run of cooling gas is too long the gas itself heats up and produces no further cooling effect.

Conventionally, a section or cooling zone comprises a single combustion zone (which may be made of many banks of burners) and a single cooling inlet and outlet. The two functions of heating and cooling are introduced by a single controller. In accordance with the invention, it is preferable to provide a number of shorter or sub-zone sections with regard to cooling as shown in the apparatus as illustrated in the drawings, while retaining a single zone as far as combustion is concerned. This maximizes cooling while retaining the simplicity of a single zone control. The amount of combustion gases is controlled by the supply of gas to the burners 26. By adjusting the degree of opening of the dampers 30 on the combustion gas outlets 28 the pressure in the side chambers 20 can be adjusted and, if desired, balanced with that within the central cooling chamber 18 so that effectively there is no mixing of the heating and cooling gas streams. Alternatively, where it is desired to heat the whole of the glass stream, including the central section, the dampers 30 can be shut completely forcing combustion gases to exhaust via the cooling gas outlets 24 over the central section 18 thereby heating the glass in the central section as well as the side sections 20.

Figure 3:
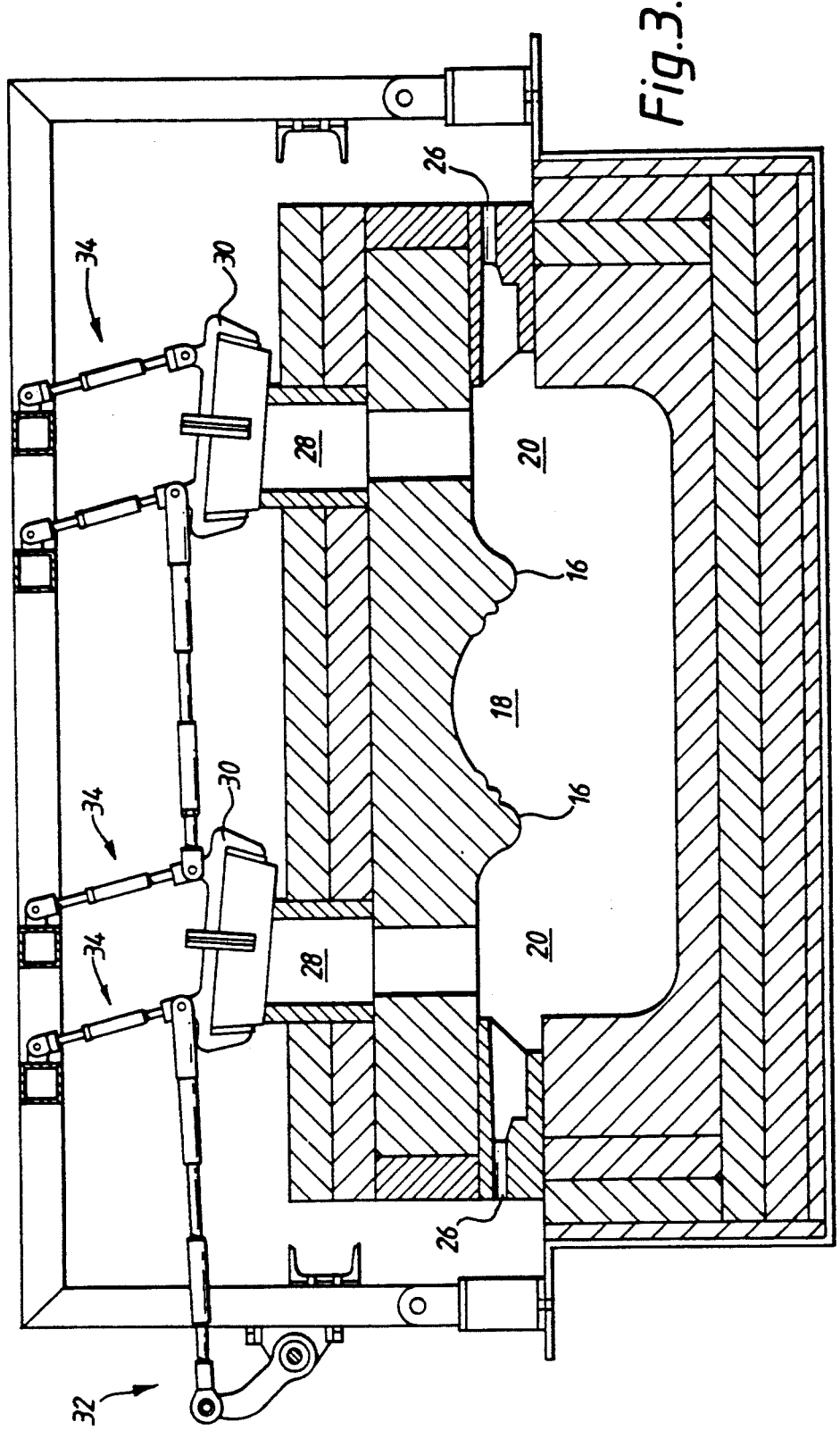
FIG. 3 is a similar view to FIG. 2 illustrating the damper mechanisms.

As can be seen from FIG. 3 the dampers 30 are controlled by electric or pneumatic actuators 32 acting through parallelogram linkages 34. In this way, instead of the damper blocks 30 having a simple up and down movement they have a tilt and lift movement allowing accurate control of the degree of opening, and therefore of the pressure within the chambers 20.

Figure 5A:
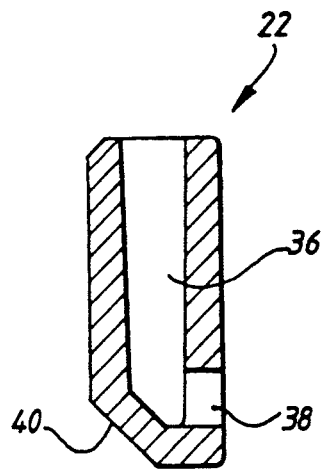
FIG. 5 is detail of the cooling gas inlet/outlet.
Figure 5B:
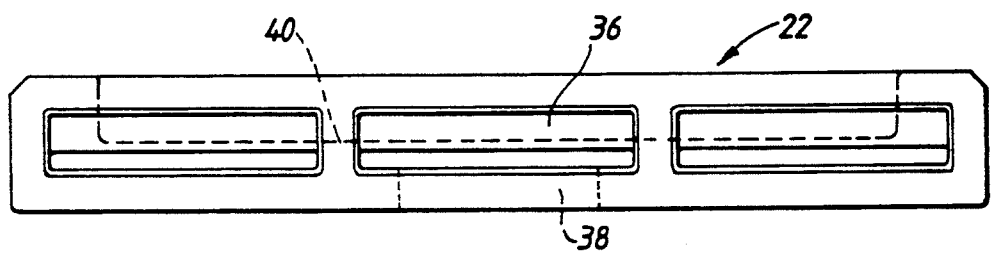
Figure 5C:
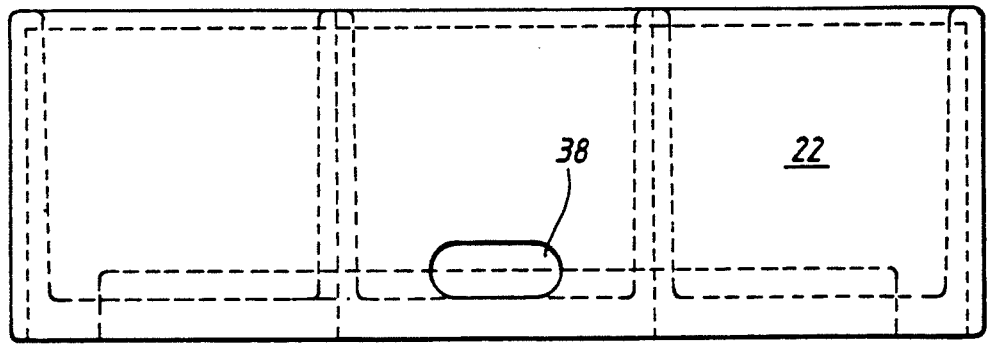

In FIG. 5 an enlarged view of the cooling gas inlet 22 is shown. It can be seen that it comprises a block having a central bore 36 with an outlet 38 at right angles thereto. The area of the block 40 opposite the outlet 38 is angled. This construction is considerably superior to the type of air inlet blocks employed hitherto and it is believed constitutes an inventive feature in its own right. It will be appreciated that the entire block 22 extends across both the central cooling chamber 18 and the outer chambers 20 where, in the latter case, it provides separation between adjacent longitudinal sections of the forehearth 10 whereas in the case of the central chamber 18 it both provides separation between the adjacent longitudinal sections as well as inlet of cooling air.

By the use of a controller, including a suitably programmed micro processor, the control of combustion, rate of cooling combustion gas exhaust can be made automatic. The degree of cooling or heating and the position of the swinging exhaust dampers 30 can thus be controlled automatically based on input from temperature sensors along the forehearth and in each of the side and central zones. By this means, the forehearth of the invention provides an extremely accurate control of temperature and homogeneity of the glass being delivered to a glass forming machine.

Figure 6:
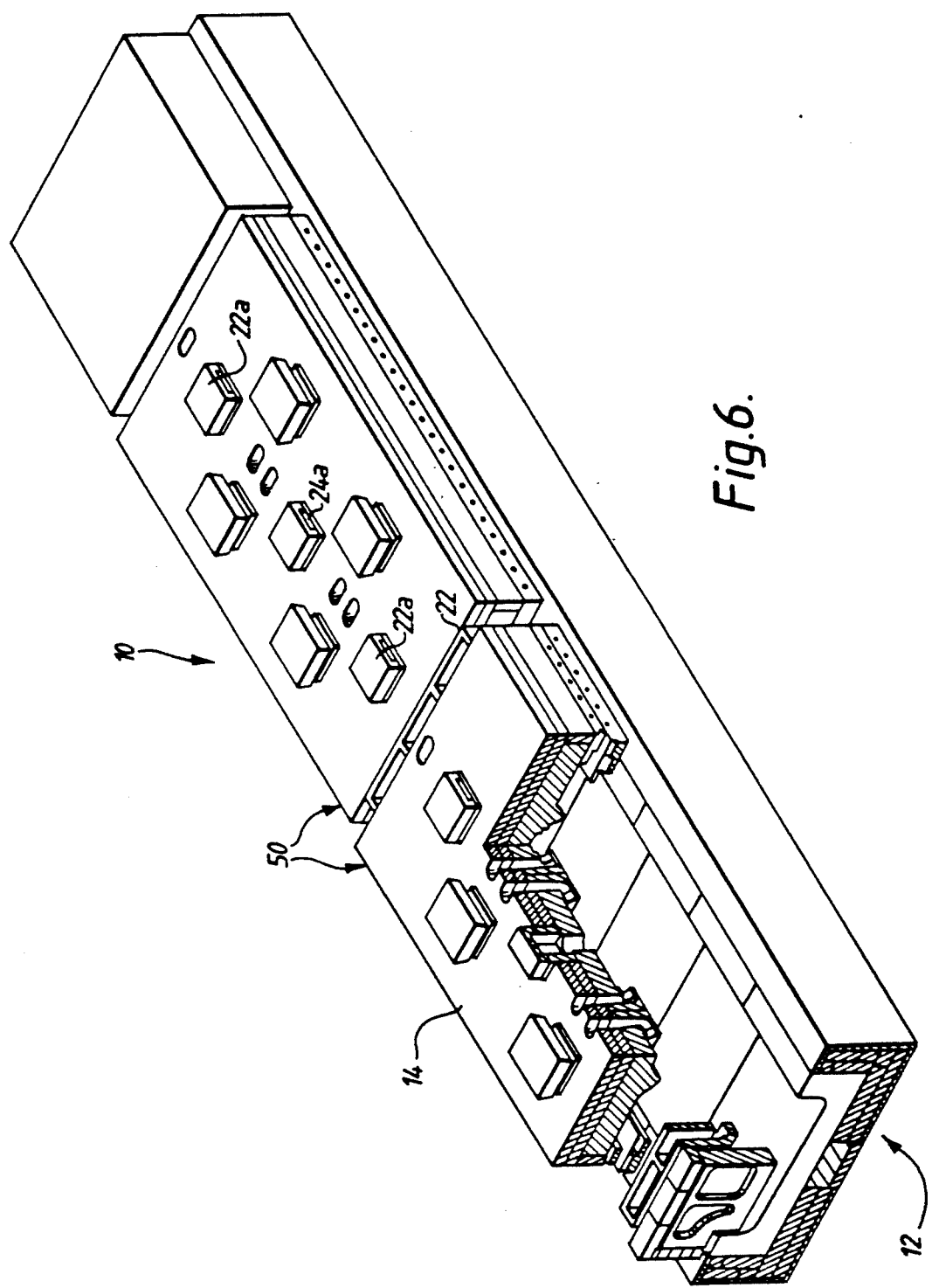
FIG. 6 is a similar view to FIG. 1 of a modified form of forehearth according to the present invention.

Turning now to FIG. 6, and using like numerals for like parts, a modified form of the forehearth described above is shown. In this, the roof section of the forehearth is divided into sections or "chambers" 50 each having a pair of cooling air inlets 22A towards the front and towards the rear respectively of the chamber, together with a central cooling air outlet 24A. Thus air is fed into each sectional "chamber" 50 at either end and is exhausted by the central outlet 24A. The consequence of this is that the air flows in two directions within each chamber 50. The air supply to each chamber 50 is individually controllable.

In this embodiment, owing to the concept of discrete chambers 50, it is no longer necessary to sub-zone the first cooling section as illustrated in FIG. 4. Moreover, the length of the chambers 50 can be chosen to give optimum heat exchange. The control methods and mode of operation with this embodiment is essentially the same as that previously described.

While various embodiments of the present invention have been described in detail, it is apparent that modifications and adaptations of those embodiments will occur to those skilled in the art. It is to be expressly understood that such modifications and adaptations are within the spirit and scope of the present invention.

What is claimed is:

1. A forehearth, comprising:
   (a) a trough comprising a bottom portion and two side portions;
   (b) a roof disposed over said trough to define a chamber for containing molten glass;
   (c) means for injecting cooling gas into a cooling zone, said cooling zone defined by at least two longitudinally disposed ridges extending downwardly toward said trough bottom portion from said roof;
   (d) means for removing cooling gas from said cooling zone;

(e) means for heating side zones by introducing combustion gases into said side zones, said side zones defined by said longitudinally disposed ridges; and (f) means for removing combustion gases from said side zones, said means for removing combustion gases being separate from said means for removing cooling gas.

2. A forehearth as recited in claim 1, wherein said means for injecting cooling gas comprises at least one cooling gas inlet disposed above said cooling zone.

3. A forehearth as recited in claim 1, wherein said means for removing cooling gas comprises at least one cooling gas outlet disposed above said cooling zone.

4. A forehearth as recited in claim 1, wherein said means for heating said side zones comprises at least one gas burner.

5. A forehearth as recited in claim 1, wherein said means for removing combustion gases comprises at least one combustion gas outlet having an adjustable damper adapted to control pressure of combustion gases within said side zones.

6. A forehearth as recited in claim 5, wherein said damper is controlled by actuators acting through parallelogram linkages.

7. A forehearth as recited in claim 1, further comprising longitudinal corrugations adjacent to said longitudinal ridges to increase a surface area of said cooling zone available to receive heat radiated from the surface of molten glass contained within said trough.

8. A forehearth as recited in claim 1, wherein said means for removing combustion gases and said means for removing cooling gas are adapted to be controlled to adjust pressures in each of said cooling zone and said side zones whereby no significant mixing of said cooling gas and said combustion gases occurs.

9. A forehearth as recited in claim 2, wherein said cooling gas inlet comprises a block having a central bore with an outlet portion in communication with said bore and at a right angle thereto wherein a portion of said central bore opposite said outlet portion is angled toward said outlet.

10. A forehearth as recited in claim 1, wherein said forehearth comprises at least a first cooling gas inlet and a second cooling gas inlet and at least a first cooling gas exhaust outlet wherein said cooling gas exhaust outlet is disposed in relation to said first cooling gas inlet to remove cooling gases from said first cooling gas inlet prior to the injection of additional cooling gases by said second cooling gas inlet.

11. A forehearth, comprising:
(a) a trough comprising a bottom portion and two side portions;
(b) a roof disposed over said trough to define a chamber for containing molten glass;
(c) a plurality of cooling gas inlets disposed in said roof and above a cooling zone, said cooling zone defined by at least two longitudinally disposed ridges extending downwardly from said roof, said cooling gas inlets being adapted to inject cooling gas into said cooling zone;
(d) a plurality of cooling gas exhaust outlets disposed in said roof and above said cooling zone;
(e) a plurality of gas burners disposed along the sides of said trough for injection combustion gas into side zones, said side zones defined by said longitudinally disposed ridges; and
(f) a plurality of combustion gas outlets within said roof and disposed above said side zones, wherein said combustion gas outlets are controllable by adjustable dampers.

12. A method for homogenizing molten glass in a forehearth comprising a central cooling zone and two side zones, comprising the steps of:
(a) moving molten glass in a longitudinal direction through said forehearth;
(b) introducing cooling gas through at least one cooling gas inlet disposed above said cooling zone wherein said cooling gas contacts said molten glass;
(c) extracting at least a portion of said cooling gas from said cooling zone through at least one cooling gas outlet disposed above said cooling zone;
(d) introducing combustion gases into said side zones through at least one gas burner adjacent to said side zones; and
(e) removing said combustion gases through at least one combustion gas outlet disposed above said side zones, said combustion gas outlet being separate from said cooling gas outlet.

13. A method for homogenizing molten glass as recited in claim 12, wherein a flow of combustion gases is controlled by controlling a degree of opening of said combustion gas outlet.

14. A method for homogenizing molten glass as recited in claim 12, wherein a removal rate of combustion gases and cooling gases is controllable with a damper whereby no significant mixing of the combustion gases and cooling gases occurs.

* * * * *